L. W. BOYNTON.
Making Cube Sugar.

No. 52,956. Patented Mar. 6, 1866.

Witnesses:

Inventor:
L. W. Boynton
per Brown Coombs
Attorneys

UNITED STATES PATENT OFFICE.

LEANDER W. BOYNTON, OF HARTFORD, CONNECTICUT.

IMPROVED MACHINE FOR MAKING CUBE-SUGAR.

Specification forming part of Letters Patent No. 52,956, dated March 6, 1866.

*To all whom it may concern:*

Be it known that I, LEANDER W. BOYNTON, of the city and county of Hartford and State of Connecticut, have invented a new and useful Improvement in Machines for Making Cube-Sugar; and I do hereby declare that the following is a full, clear, and exact description of the same, reference being had to the annexed drawings, making part of this specification, in which—

Figure 1:
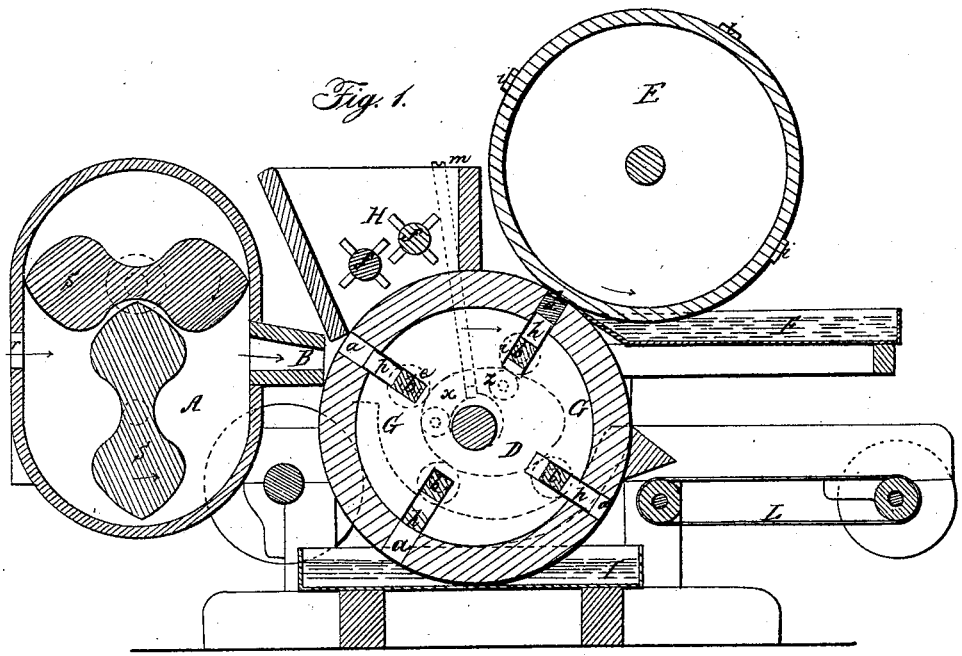
Figure 2:
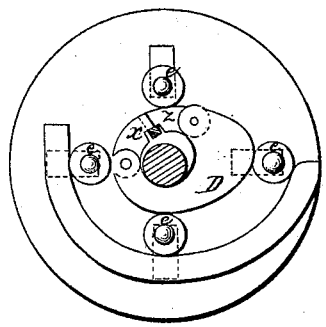

Figure 1 is a longitudinal section of the entire machine. Fig. 2 is a detached side elevation of some of the working parts employed in molding the sugar into cubes.

Similar letters of reference indicate similar parts in both figures.

In the manufacture of what is called "cube-sugar," or sugar molded into small lumps for table use, it is found necessary, after the formation of each cube or lump and its expulsion from the molds in which it is formed, to wash the mold, in order to prevent the succeeding cube from adhering to it as it is expelled therefrom and thus being injured in shape; and after washing the mold it is necessary to dry it, in order to prevent discoloration of the next cube formed therein.

This invention is designed for drying the molds after they have been washed by immersion in water; and it consists in the employment of a blast or current of air produced by any suitable blowing apparatus, and so applied and directed to the molds as to effectually accomplish the desired result.

To enable those skilled in the art to understand the nature and operation of my invention, I will proceed to describe it.

The blowing apparatus, consisting of the wings S S, rotating in the direction shown by the arrows marked thereon, is inclosed in a chamber, A, which is provided at its rearmost side with an opening, $r$, for the ingress of air. These blowers force the air in a strong current through the passage B into the molds $a$, which are formed in longitudinal rows on the circumference of the cylinder G. In each mold is a sliding plunger, $h$, the said plungers being, of course, situated in rows corresponding to the rows of molds in which they are placed. Each row of plungers $h$ is attached at the lower end to a bar, $b$. These bars $b$ are situated longitudinally in suitable slots extending lengthwise of the cylinder and wide enough to allow the bars $b$ to move sidewise, in order to allow the plungers to slide longitudinally in the molds $a$. Each bar $b$ is furnished with a friction-roller, $e$, which, as the cylinder G revolves, travels upon the perimeter of a stationary eccentric, D, which is secured to the frame of the machine at each side thereof, and operates the plunger in order to expel the pressed and molded lump of sugar from the molds. As the bottom of each mold is formed by the top of its plunger provision is made for filling the molds to a greater or less depth, thus causing the sugar in the molds to be pressed to a greater or less density. This is accomplished by forming the eccentric with two pivoted pieces, $x z$, on its upper side, the ends of which pass each other and may be moved up or down and properly adjusted by means of the rod $m$.

Situated above the cylinder G, and somewhat toward its rearmost side, is a hopper, H, in which is placed the sugar to be molded, and situated longitudinally in this hopper are two rotary toothed rollers, $ff$, which not only feed or force the sugar downward into the molds, but, in a great measure, support the superincumbent weight thereof, so as to prevent unequal pressure on the surface of the cylinder.

Placed in front of the hopper H and parallel with the cylinder G is another cylinder, E, provided upon its circumference with longitudinal rows of short projections $i$, which, as the two cylinders revolve, so fit into the outer ends of the molds as to compress the sugar therein and shape the outer surface of the cubes thus formed.

Below the cylinder E is a pan or shallow dish, F, containing water, in which is immersed the lower end of the said cylinder, so that as the cylinder rotates its projections $i$ will pass through the water and be washed thereby previous to acting upon the molds, as just mentioned. Another pan, J, of water is placed in a similar position underneath the cylinder G, in order to wash the molds $a$ previous to their being charged or filled with sugar. The water, especially that contained in the pan J, should be kept warm or hot, in order to better dissolve any gum or other extraneous substance that, being expressed from the sugar, may adhere to the mold after the cube is expelled therefrom; and, also, that by heating the cylinder G it may facilitate the evaporation from the surface of the molds, and thus assist the action of the blast of air in drying them.

I is a stationary bar extending lengthwise of the cylinder G, in front thereof, and having its upper surface inclined to direct the cubes as they fall from the molds upon the endless apron L, which conveys them to a proper receptacle.

The two cylinders G E rotate in the direction shown by the arrows marked thereon, so that the several rows of molds $a$ pass successively under the hopper H, where they are filled with sugar, and then pass under the cylinder E, where the projections $i$ enter them and compress the sugar into a solid cube or lump. As soon as this is done the stationary eccentric D pushes the plungers $h$ outward in the molds, and thus expelling the pressed and molded cubes therefrom, which fall across the bar I upon the endless apron L, as hereinbefore explained. The plunger $h$, having thus emptied the molds of their contents, move back to their places as the friction-rollers $e$ pass to the lower side of the eccentric, and the molds $a$, passing through the warm water in the pan J, are thoroughly washed, the continued rotation of the cylinder G being then opposite the passage B, upon which the current of air from the blowing apparatus enters them and expels the moisture therefrom, partly by driving it out by the force of the blast and partly by evaporating it, so that the molds are thoroughly dried to receive the succeeding charge of sugar.

I do not limit myself to the employment of the particular blowing machinery represented in the drawings, inasmuch as any of the ordinary methods of producing a blast or current of air will be equivalent thereto; but

What I claim as new, and desire to secure by Letters Patent, is—

The employment of a blast or current of air applied and directed to the molds of a machine for molding sugar, substantially as herein set forth, for the purpose specified.

LEANDER W. BOYNTON.

Witnesses:
WILLIAM BROWN,
GEO. A. HOLT.